Nov. 30, 1926.
R. H. HAFNER
HYDROMETER
Filed August 17, 1925
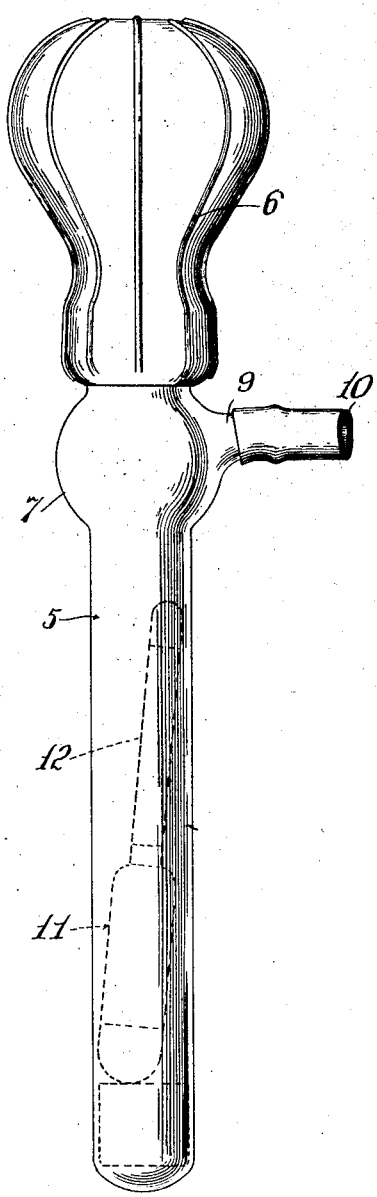
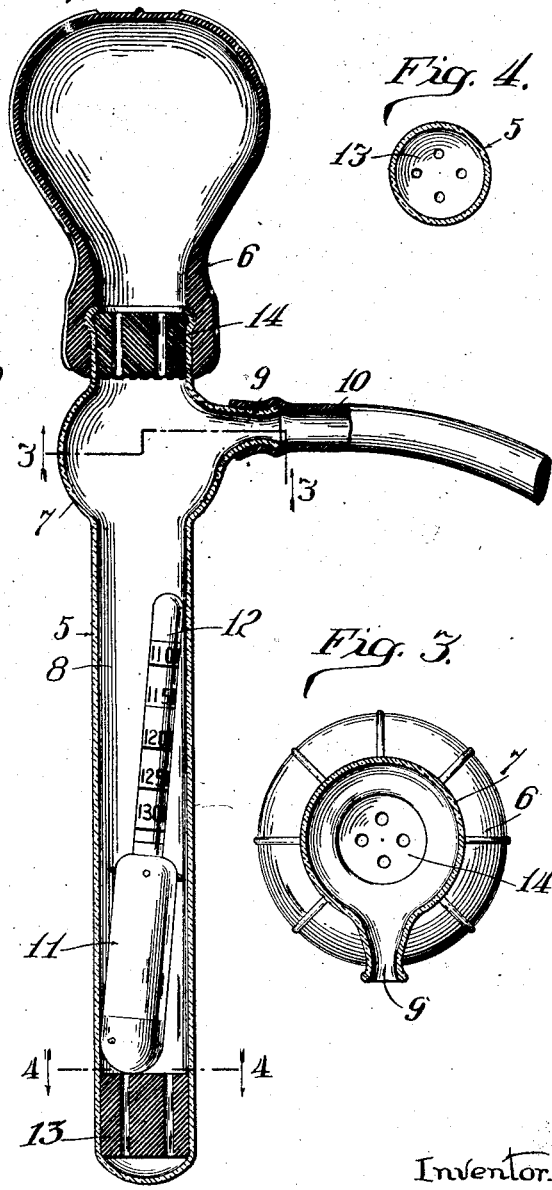
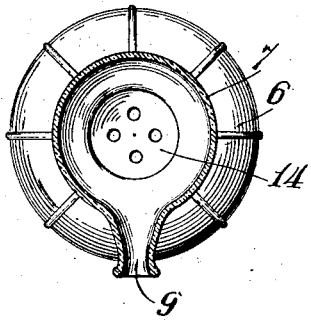
Inventor.
Robert H. Hafner,
By John L. Jaurran,
Attorney
Witness
Milton Lenoir Patented Nov. 30, 1926.

1,609,115

UNITED STATES PATENT OFFICE.

ROBERT H. HAFNER, OF GLEN ELLYN, ILLINOIS.

HYDROMETER.

Application filed August 17, 1925. Serial No. 50,593.

My invention relates to instruments for testing the specific gravity of liquids, generally termed hydrometers, and has for its object to provide an improved hydrometer which will be well adapted for use in testing storage batteries. Such hydrometers as heretofore constructed have usually comprised a tube open at both ends, the intermediate portion of the tube forming a float chamber for the reception of a float gauge suitably graduated to indicate the specific gravity of the liquid in the tube. The lower end of the tube is provided with a filling connection in the form of a neck or nozzle adapted for the application thereto of a rubber tube which can be inserted in a cell of a battery, while the upper end of the tube is arranged to receive a rubber bulb by the operation of which liquid can be drawn from the battery into the tube to float the gauge, the liquid being expelled after the test by compression of the bulb. Such hydrometers have been quite extensively used notwithstanding the fact that their use is attended with considerable danger of spilling the battery fluid on the floor or other places where it is apt to do damage due to its acidity. In making hydrometer tests it is of course necessary to hold the tube upright so that the gauge will float freely in the float chamber, and the filling opening being at the lower end of the tube there is obviously great danger that the fluid will drip from it; moreover any slight pressure on the bulb when the tube contains liquid will cause it to be ejected to a greater or less extent. The object of my present invention is to remedy these defects. I accomplish my purpose as hereinafter described and illustrated in the drawings. What I regard as new is set forth in the claims.

In the drawings,—

Fig. 1 is an elevation of my improved hydrometer, part of the filling tube being omitted;

Fig. 2 is a vertical section thereof;

Fig. 3 is a cross-section on line 3—3 of Fig. 2; and

Fig. 4 is a cross-section on line 4—4 of Fig. 2.

The drawings illustrate the preferred embodiment of my invention which comprises a tube 5 closed at its lower end and open at its upper end, the latter end being adapted for the application thereto of a rubber bulb 6. Adjacent to its upper end the tube is enlarged laterally, as shown at 7, and that portion of the tube below such enlargement constitutes a float chamber indicated by 8. At one side of the enlargement 7 the tube 5 is provided with a laterally disposed filling connection 9 in the form of a neck or nozzle adapted to receive a flexible tube 10 through which the liquid to be tested may be drawn into, or forced out of, the float chamber. The length of the float chamber 8 is such that it is adapted to receive a float gauge 11 of the usual type having a graduated stem 12, and at the bottom of said float chamber is a cushion plug 13 on which the gauge rests when the liquid is expelled. Also I prefer to provide a cushion plug 14 at the upper or open end of the tube for cushioning the upper end of the gauge if it should be caused to jump up in the tube by sudden filling of the float chamber.

In using my improved hydrometer the free end of the tube 10 is inserted in the battery cell and the bulb 6 is then compressed, whereupon on relaxation of the bulb the ensuing suction causes the liquid to be drawn into the upper portion of the tube 5 until it is filled to the desired extent. The tube 10 may be made long enough to reach the cells of a storage battery contained in a cabinet such as are used at the present day in connection with radio apparatus, so that it is unnecessary to disturb the position of the battery, and because of the position of the filling connection 9 the hydrometer may be turned to any convenient position for the filling operation, and after the float chamber has been filled, by partially rotating the tube to bring the connection 9 to its upper side, there is no danger of spilling the battery fluid. By providing the enlargement 7 sufficient liquid can be drawn into the tube so that when the hydrometer is turned to an upright position for making a test the gauge will be properly floated, but without filling the tube to such an extend that when it is in either a vertical or a horizontal position the fluid will be apt to escape through the filling connection. Of course, when the instrument is turned to a horizontal position the connection 9 should be brought to the upper side of the tube. It will be noted that by the construction described should the bulb be compressed while making a test no harm will result as the connection 9 is then above the liquid level.

After the test has been made the tube is turned to a horizontal position with the filling connection 9 at the lower side thereof, whereupon by compressing the bulb the liquid may be expelled. When the float chamber has been filled, by raising the free end portion of the tube 10 slightly higher than the filling opening 9 any liquid in said tube will be caused to flow into the float chamber, so that there is no danger of its dripping from said tube.

While I prefer to locate the bulb 6 in axial alinement with the tube 5 my invention is not limited to so placing it, as the upper end of the tube may, if desired, have a laterally disposed open neck for the reception of the bulb. Also I wish it to be understood that the lower end of the tube may be closed in any suitable way, as by inserting a plug in one end of an open tube, although the construction shown is preferable.

What I claim as my invention and desire to secure by Letters Patent, is—

1. A hydrometer tube comprising a lower portion closed at its lower end and forming a float chamber, and an upper portion arranged for the application of a bulb thereto and having a laterally-disposed filling connection above said float chamber.

2. A hydrometer tube comprising a lower portion closed at its lower end and forming a float chamber, and an upper portion arranged for the application of a bulb thereto and having a laterally-disposed filling connection above said float chamber, said tube being enlarged laterally adjacent to said filling connection.

3. A hydrometer comprising a tube closed at its lower end, and open at its upper end, the lower portion of said tube forming a float chamber, a bulb applied to said tube above said float chamber, a filling connection communicating laterally with said tube above said float chamber, and a float gauge in said float chamber.

4. A hydrometer comprising a tube closed at its lower end and open at its upper end, the lower portion of said tube forming a float chamber, a bulb applied to the open end of said tube, a lateral enlargement connected with the upper end of the float chamber, a laterally disposed filling connection leading to said enlargement, and a float gauge in said float chamber.

ROBERT H. HAFNER.